United States Patent [19]

Shinozuka

[11] Patent Number: 5,008,141

[45] Date of Patent: Apr. 16, 1991

[54] CUSHIONING MATERIAL FOR MATTRESSES

[75] Inventor: Tokihito Shinozuka, Tokyo, Japan

[73] Assignee: Paramount Bed Co., Ltd., Tokyo, Japan

[21] Appl. No.: 353,329

[22] Filed: May 16, 1989

[30] Foreign Application Priority Data

May 27, 1988 [JP] Japan ................................ 63-129710

[51] Int. Cl.[5] ........................... B32B 3/28; B32B 5/06; A47C 27/00

[52] U.S. Cl. ....................................... 428/182; 428/74; 428/76; 428/131; 428/179; 428/296; 428/300; 428/301; 112/402; 112/422; 112/438; 5/420; 5/448; 5/500; 2/267

[58] Field of Search ........................ 2/267; 248/188.8; 5/417, 420, 431, 432, 443, 446, 448, 464, 420, 471, 472, 476, 500, 502; 428/68, 70, 72, 74, 76, 156, 167, 178, 179, 182, 223, 234, 245, 318.8, 192, 174, 300, 301, 296, 131; 112/402, 405, 406, 420, 421, 422, 429, 438, 440, 441

[56] References Cited

U.S. PATENT DOCUMENTS 992,354 5/1911 Heermans .............................. 5/448
1,644,600 10/1927 Morgan .................................. 5/448
1,992,603 2/1935 Burgess .................................. 5/448
2,029,370 2/1936 Heldenbrand .......................... 5/448
2,339,326 1/1944 Fourness et al. ....................... 5/448
2,627,644 2/1953 Fosters ............................... 428/182
2,678,686 5/1954 Schulz .................................... 5/448
2,689,811 9/1954 Frederick et al. ................. 428/182
4,761,321 8/1988 McCall et al. ...................... 428/179

FOREIGN PATENT DOCUMENTS 52-152573 12/1977 Japan .
61-36954 8/1986 Japan .

*Primary Examiner*—Ellis P. Robinson
*Assistant Examiner*—Donald J. Loney
*Attorney, Agent, or Firm*—Wenderoth, Lind & Ponack

[57] ABSTRACT

A cushioning material for mattresses is formed by needling a pile of crimped fibers to form a flat board, and then continuously and alternately bending the flat board to form a corrugated web. The corrugated web thus formed has a number of side-by-side contact portions and a number of bent portions connecting the side-by-side contact portions. The bent portions thus form a relatively soft surface portion of the cushioning material, and the side-by-side contact portions provide a moderately rigid portion of the cushioning material. The corrugated web may be held together by sewing, bonding or welding.

6 Claims, 6 Drawing Sheets

CUSHIONING MATERIAL FOR MATTRESSES

BACKGROUND OF THE INVENTION

1. Field of the Invention

The present invention relates to a cushioning material for mattresses.

2. Description of the Prior Art

Typically mattresses are required to have the properties of moderate cushioning and permeability. A mattress should be soft, at least on the side of the mattress in contact with the human body. But if the entire mattress is soft, the user will tend to sink into the mattress to too great an extent. This will result in the user feeling uncomfortable in bed, and making the user tired because of the difficulty in turning over in bed. To prevent an unnatural sinking into the mattress of the bed, the cushioning material of the mattress must then have a moderate rigidity.

Conventional mattress cushioning materials that have a moderate rigidity include hard synthetic resin foam board, spring structured materials having many closed springs extending in a number of different directions, and structures having a plurality of crimped fibers, the structures being formed by needling the plurality of crimped fibers and bonding joints of the crimped fibers with adhesive in order to hold the form of the structure, as described in Japanese Patent Early-Disclosure No. 77-152573, and Japanese Patent Publication No. 86-35954. In general, the latter two types of cushioning materials have excellent permeability characteristics. In order to use any of the above-mentioned cushioning materials as a mattress, a soft cushioning material having a relatively smaller spring constant is laminated on both sides of the cushioning material in order to make the mattress softer near the surfaces of the mattress in contact with the human body.

A problem with this type of mattress structure is that recently beds have come into use, particularly the types of beds used in hospitals, which have an undulating bed plate or undersurface. Mattresses used on this type of bed are required to bend according to the undulation of the bed plate. However, the cushioning material structures discussed above, having a moderate rigidity, are difficult to bend due to this rigidity. If this type of mattress having a moderately rigid cushioning material is used on such a bed, partial swelling of the mattress may occur, and deformation of and damage to the mattress is likely to be caused by the bending of the mattress. As a result, the user of such a bed may experience a feeling of discomfort, and the durability of the mattress will gradually be degraded.

SUMMARY OF THE INVENTION

The present invention has been developed in view of the above-mentioned problems with respect to prior moderately rigid mattress structures. Accordingly, the object of the present invention is to provide a cushioning material for mattresses which will have a moderate rigidity for preventing the unnatural sinking of a user into the mattress, softness in portions of the mattress near the surface of the mattress in contact with the user, and a moderate bendability so as to be usable with undulating type beds.

The cushioning material of the present invention is constructed of a flat board formed by needling a pile of crimped fibers in a thickness direction of the pile. The flat board thus formed is then continuously and alternately bent in a vertical direction so as to form a plurality of consecutive side-by-side contact portions. There is thus formed a corrugated web. The corrugated web form is held together by machine sewing, bonding or welding. The side-by-side contact portions may be vertical with respect to the plane of the overall corrugated web, or the side-by-side contact portions may be inclined. The side-by-side contact portions form a moderately rigid structure for the body of the cushioning materials, whereas the bends of the flat board at the surfaces of the corrugated web form a relatively soft portion for contact with a user. Because the cushioning material has been formed as a corrugated web, the cushioning material is more bendable than the cushioning materials known in the prior art.

BRIEF DESCRIPTION OF THE DRAWINGS

FIG. 1(*b*) is a side view of the cushioning material of FIG. 1(*a*);

FIG. 2(*b*) is a side view of the cushioning of material of FIG. 2(*a*);

FIG. 4(*b*) is a cross-sectional view of a needled flat board used in the cushioning material of the present invention;

DETAILED DESCRIPTION OF THE INVENTION

Figure 3:
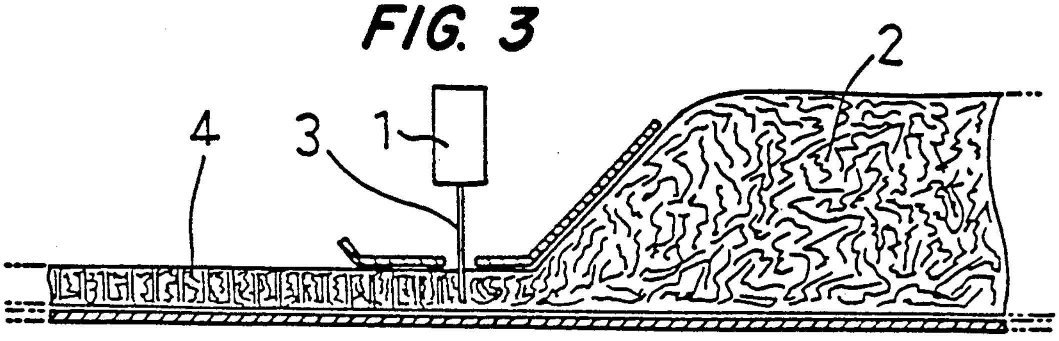
FIG. 3 is a cross-sectional view of a needling machine used in preparing the cushioning material of the present invention.
Figure 4A:
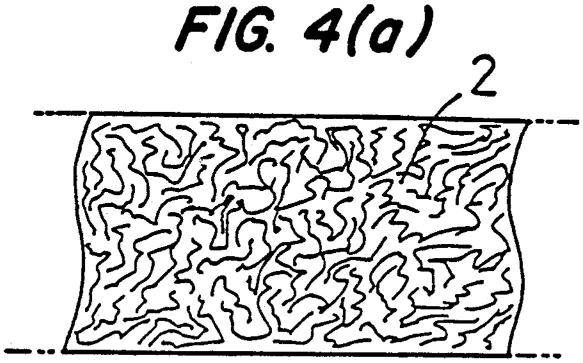
FIG. 4(*a*) is a cross-sectional view of a pile of crimped fibers used in the cushioning material of the present invention.
Figure 4B:
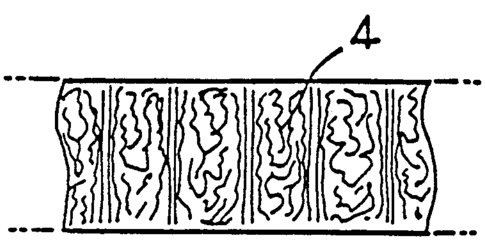

Initially referring to FIG. 3, a flat board 4 is formed by having a needling machine 1 needle a pile of crimped fibers 2. The multitude of crimped fibers randomly dispersed in the pile 2 tend to be intertwined throughout the pile in all directions. By having the needling machine 1 pierce the pile 2 with needles 3, the crimped fibers are bound together. As can be seen from FIG. 4(*b*), at or near locations where the needles 3 have pierced the flat board 4 and formed needle punctures, a large number of the fibers are turned in the direction of thickness of the flat board 4. As a result, the cushioning property of the flat board 4 in the thickness direction will be different from that in the plane direction, i.e. the direction orthogonal to the thickness direction. That is, as seen and described later in FIG. 6(*a*), the spring constant of the flat board 4 in the thickness direction is smaller than the spring constant of the flat board 4 in the plane direction.

The crimped fibers can be selected from, for example, polyester fibers, polyethylene fibers, polypropylene fibers and composite fibers thereof. The crimped fibers should preferably have a fineness between 30 and 1000 deniers. The length of the crimped fibers should preferably be in the range of 25 mm to 200 mm.

Figure 1A:
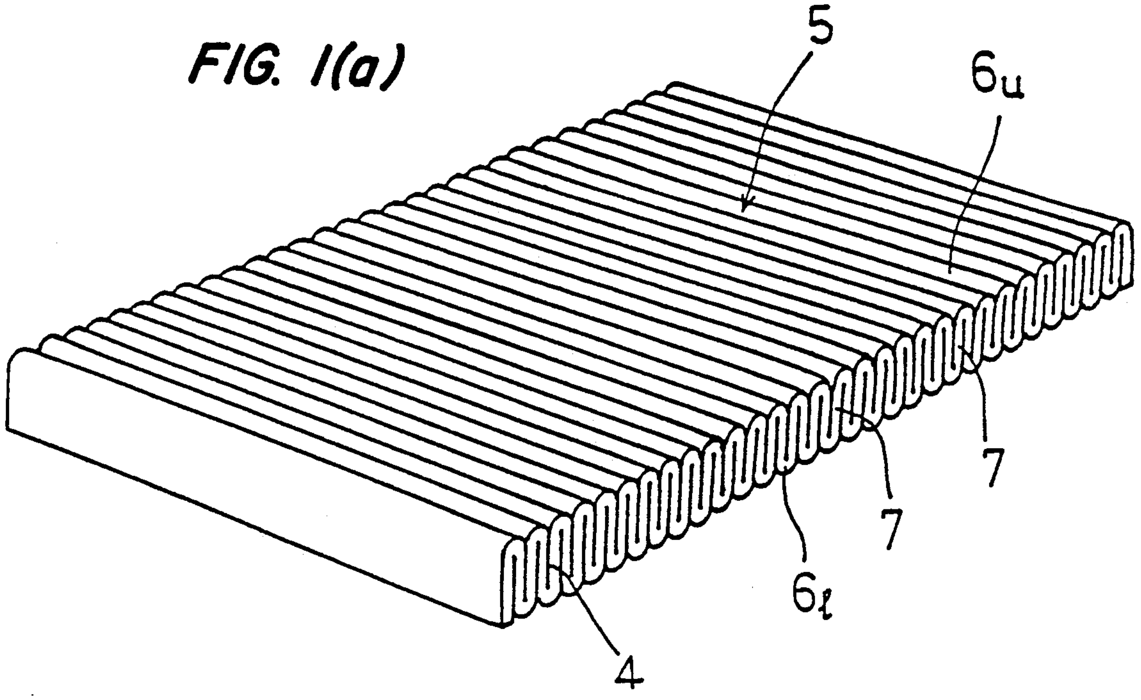
FIG. 1(*a*) is a perspective view of a cushioning material according to a first embodiment of the present invention.
Figure 1B:
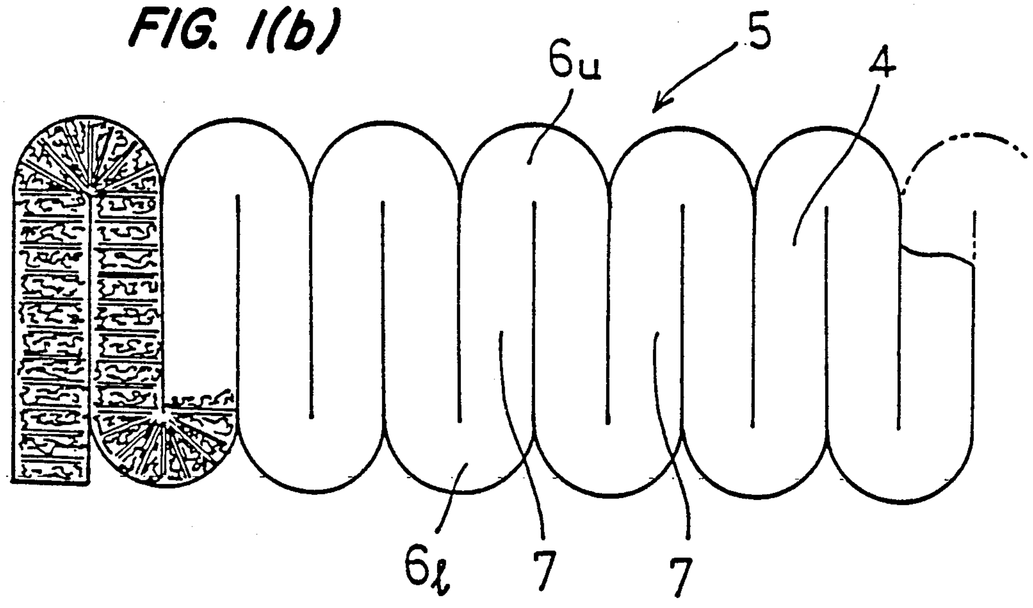
Figure 2A:
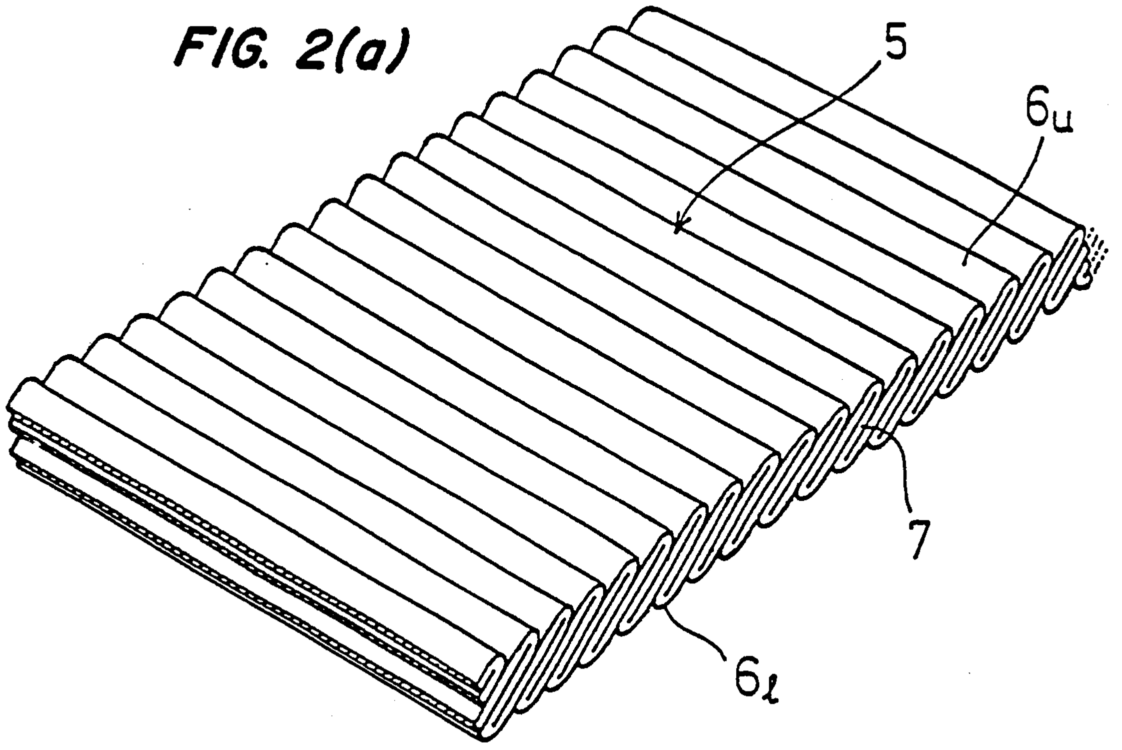
FIG. 2(*a*) is a perspective view of a cushioning material according to a second embodiment of the present invention.
Figure 2B:
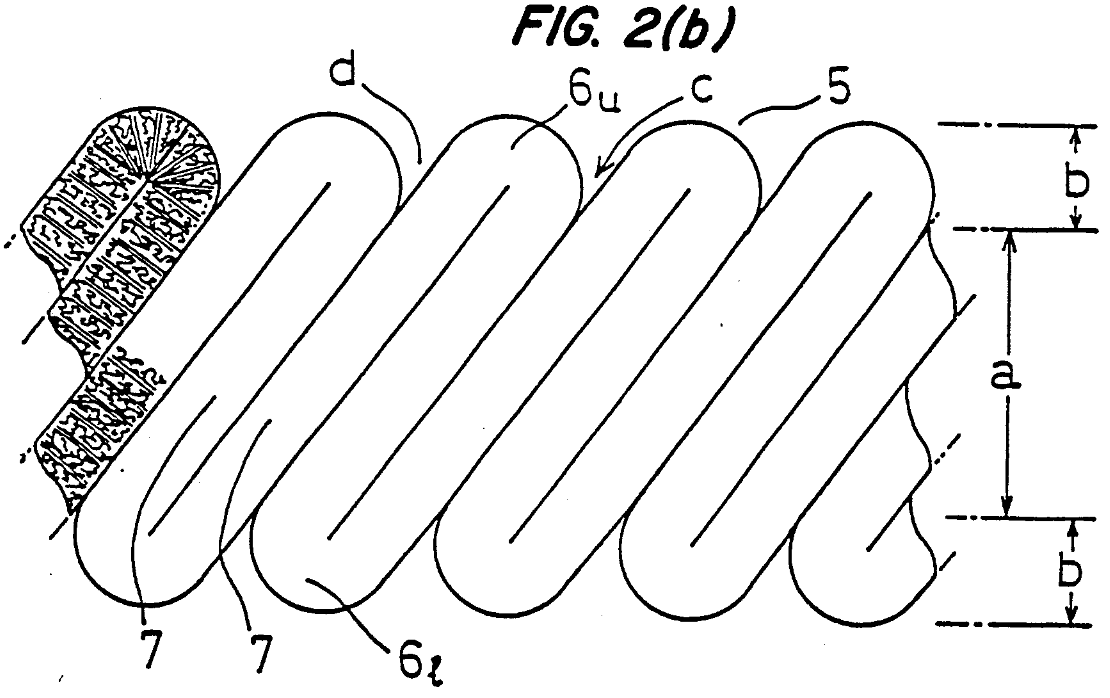

The flat board 4 formed from the fiber pile 2 is continuously and alternately bent to form a cushioning material 5, as seen from FIGS. 1 (*a*) and (*b*). The flat board 4 thus bent is held together in this position to form a corrugated web. The corrugated web is thus comprised of bent portions 6 and side-by-side contact portions 7. The side-by-side contact portions 7 may be upright, as seen in FIG. 1, or they may be inclined, as shown in FIG. 2. The corrugated web is held together by any appropriate method, such as sewing, bonding, or welding, as further described below. The cushioning material 5 may be used as padding to be covered with a covering material 8 (see FIG. 7) to form a mattress by itself or together with another such cushioning material, as required.

When a mattress having a cushioning material according to the present invention is used, the weight of a person using the mattress acts from top bent portions $6_u$ through the side-by-side contact portions 7 toward bottom bent portions $6_l$. As such, the tops of the bend portion 6 receive the weight of the user in the thickness direction of the flat board 4. In accordance with the curve of the portion 6, the weight receiving direction gradually shifts from the thickness direction at the tops of the portions 6 to the plane direction at the side-by-side contact portions 7. Because the bent portions 6 have a relatively small spring constant, and are therefore soft, the top bent portions $6_u$ softly support the body of a user, while the bottom bent portions $6_l$ ease the impact of the user on the cushioning material. Because the side-by-side contact portions 7 correspond to the plane direction of the flat board 4, the side-by-side contact portions 7 have a relatively large spring constant, and are therefore moderately rigid, thus preventing an unnatural sinking of the body of a user into the cushioning material of the mattress. The cushioning material 5 of the present invention is thus similar in its cushioning properties to the laminate material of the prior art having a soft cushioning material laminated on both sides of a rigid cushioning material.

Figure 6A:
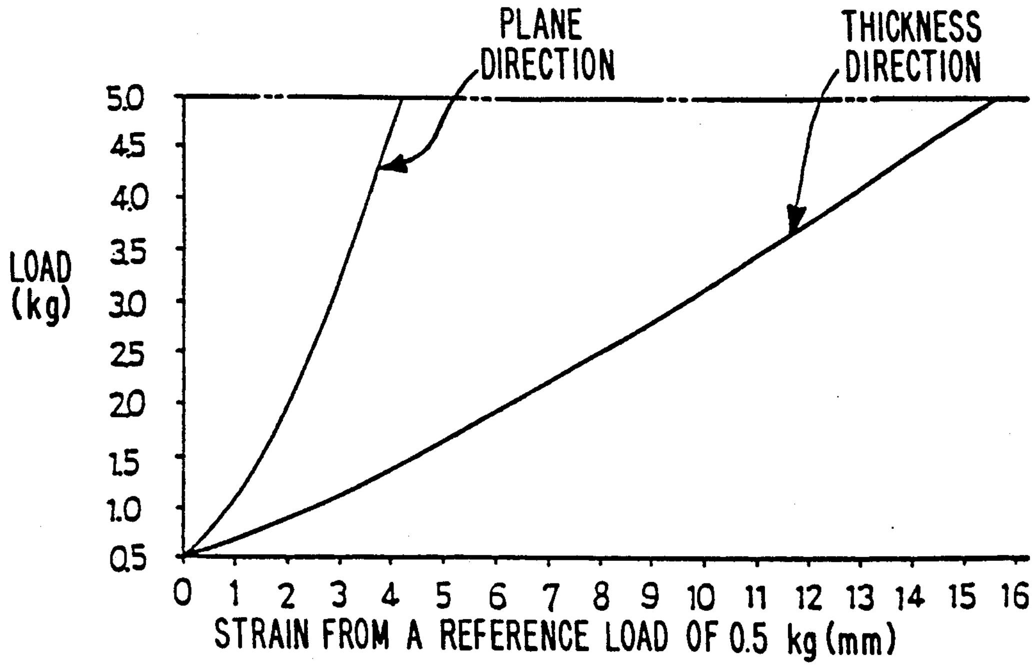
FIGS. 6(*a*) and (*b*) are diagrams illustrating the relationship between the load on the cushioning material and the strain of the flat board and the cushioning material.
Figure 6B:
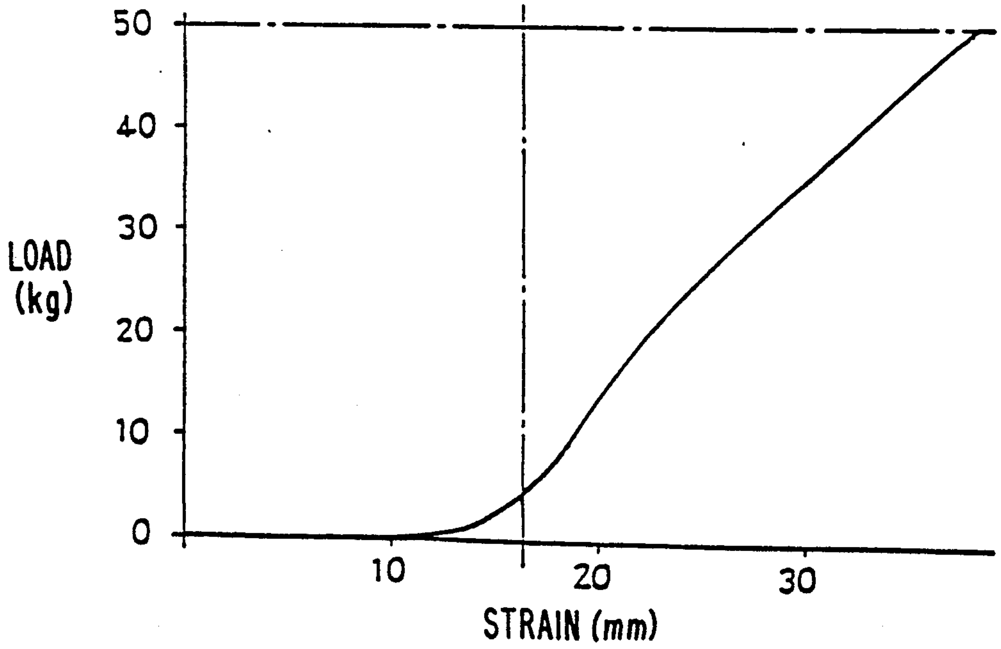

As is illustrated in FIG. 6(*b*), if a load on the cushioning material 5 of the present invention is gradually increased, the strain of the cushioning material will initially change greatly with the increase in load, since the spring constant of the bent portion 6 is relatively small. But if the strain exceeds a predetermined value, the change of strain in response to the increase in load decreases, since the spring constant of the side-by-side contact portion 7 is relatively large. The strain up to the predetermined value can be considered as the strain of the bent portion 6, and thus it is seen that the cushioning material 5 of the present invention is similar in cushioning property to the laminate material of the prior art having a soft cushioning material laminated on both sides of a rigid cushioning material.

There will now be described the situation where a mattress according to the present invention is used on a bed having an undulating bed plate or undersurface. As an example, if a bed plate or undersurface corresponding to the back of a user of the bed is raised by pivotally rotating that portion, a bending load will act on the mattress in an upward bending direction.

Figure 5:
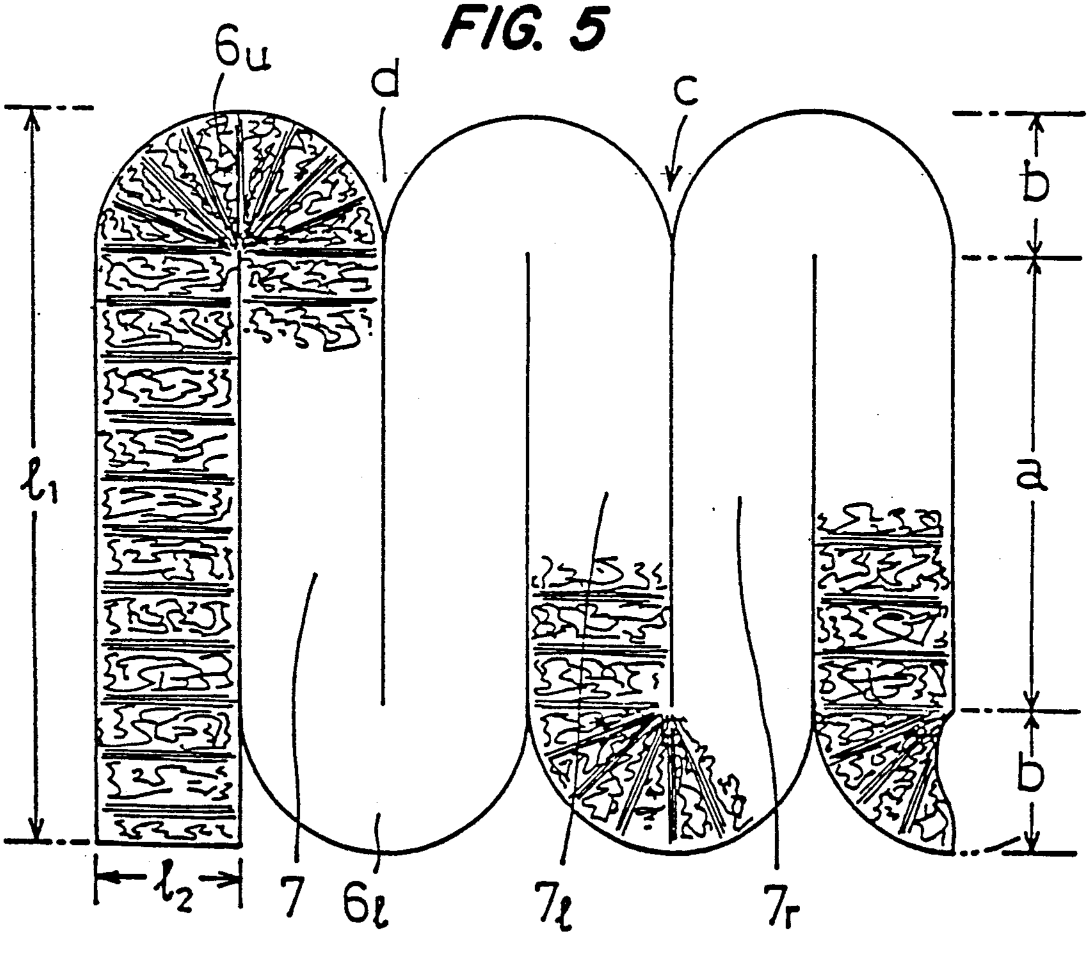
FIG. 5 is an enlarged cross-sectional view of the cushioning material of the present invention.

Referring now to FIG. 5, there is indicated an upward bending line C of the cushioning material 5. When the cushioning material 5 is bent, the side-by-side contact portions $7_l$ and $7_r$, on both sides of the bending line C, receive a compressive load acting at the upper portions thereof, and a tensile load acting at the lower portions thereof. The resistance of the cushioning material at these points acts as a resistance against bending. However, the thickness a of the side side-by-side contact portions 7 on which these loads act is thinner than the total thickness $l_1$ ($l_1 = a + 2(b)$) of the cushioning material 5, and the direction of these loads corresponds to the thickness direction of the flat board 4, the flat board 4 having a relatively small spring constant in the thickness direction. As such, the resisting force of the side-by-side contact portions 7 is small, and allows easy bending. Furthermore, because there are gaps d adjacent bent portions 6, as illustrated in FIG. 5, swelling of the bed in the bending direction can be prevented.

The ratio of the thickness a of the side-by-side contact portion 7 to the total thickness $l_1$ of the cushioning material 5 can be decreased by inclining the side-by-side contact portions 7, as shown in FIG. 2, to allow easier bending as compared with the upright arrangement of the side-by-side contact portions 7 shown in FIGS. 1 and 5. Inclination of the side-by-side contact portions 7 can also be used to change the cushioning property of the cushioning material 5. As with the above described embodiment, the cushioning material 5 having inclined side-by-side contact portions 7 satisfies the requirements of having a moderate rigidity for preventing the unnatural sinking a user into the mattress, softness in the portions of the cushioning material 5 near the surface of the cushioning material 5 in contact with the user, and moderate bendability.

Figure 7:
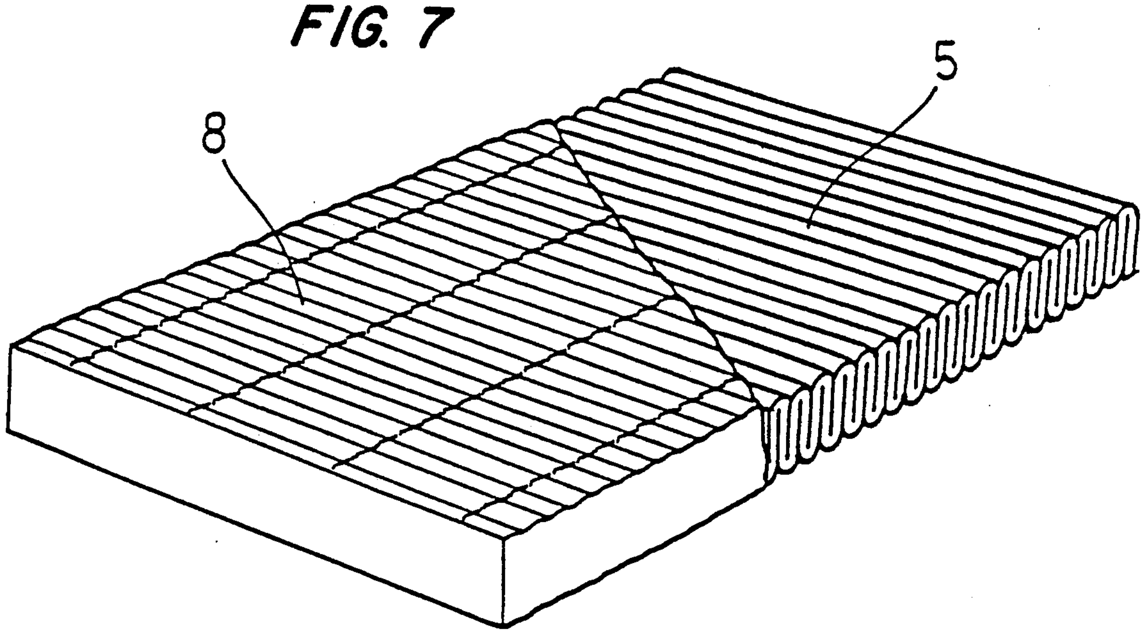
FIG. 7 is a perspective view of a method of holding the corrugated web of the present invention together.
Figure 8A:
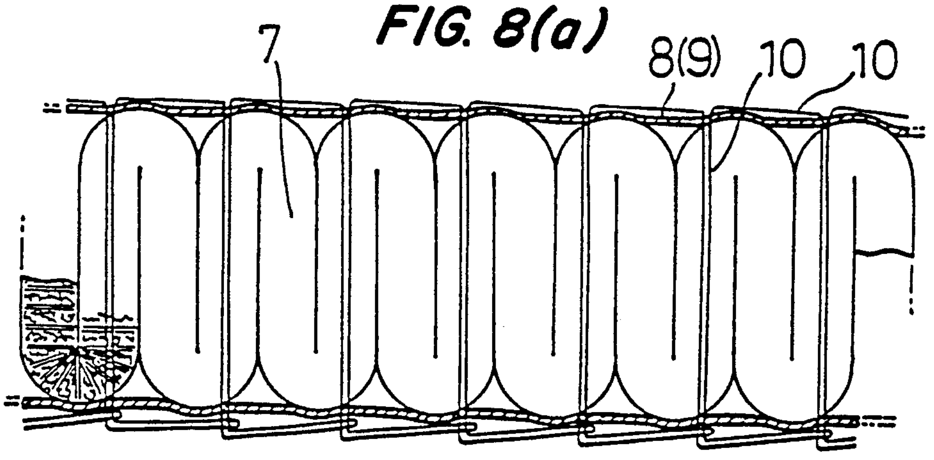
FIGS. 8(*a*) and (*b*) and 9(*a*) and (*b*) are cross-sectional illustrations of methods for holding the corrugated web of the present invention together.
Figure 8B:
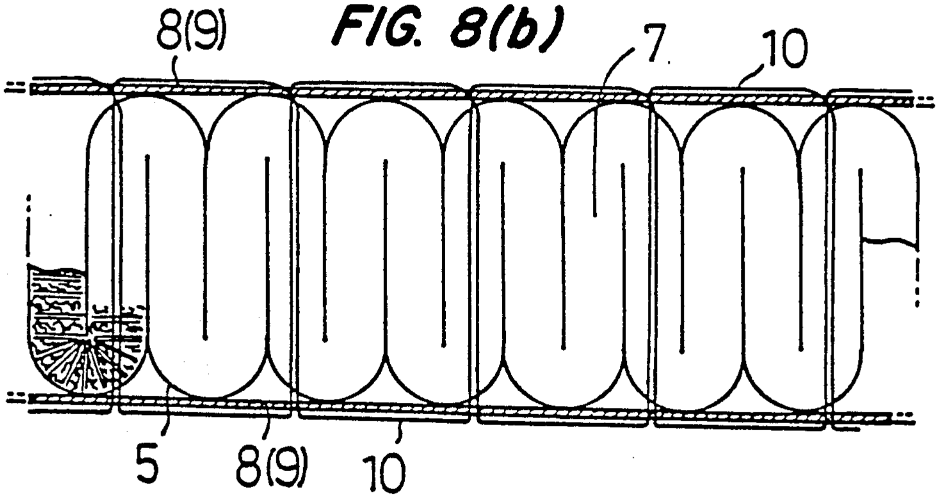
Figure 9A:
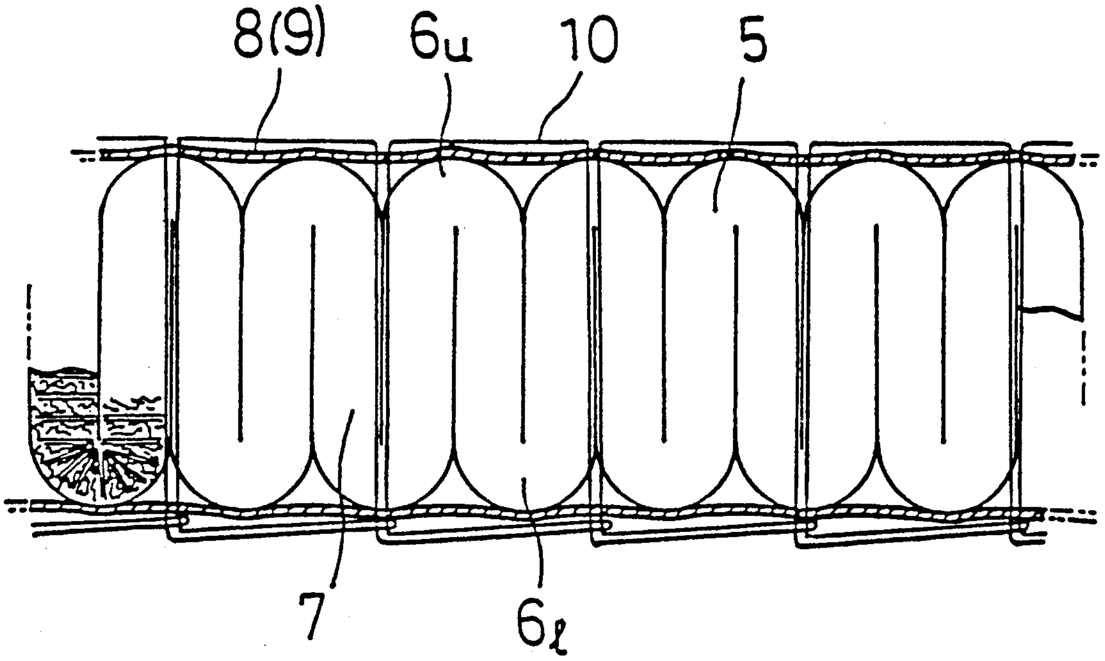
Figure 9B:
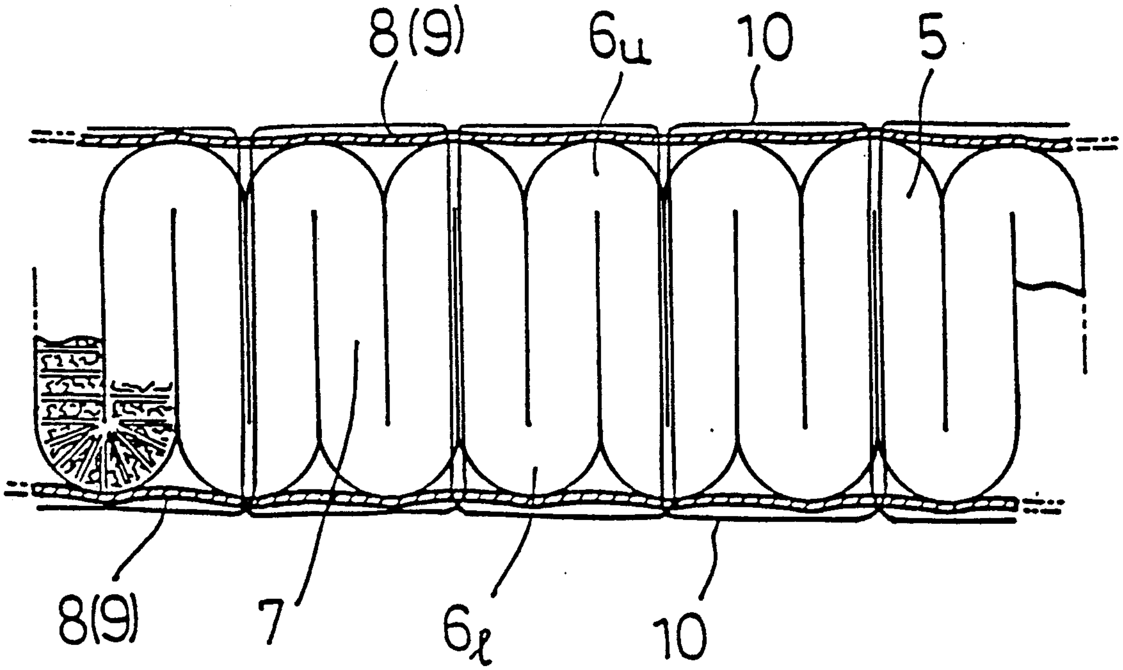

The manner in which the corrugated web is held together will now be described. FIGS. 7 and 8 illustrate the cushioning material 5 formed as a corrugated web according to the present invention, the web held together by machine sewing. As illustrated in the figures, the corrugated web is quilted by sewing it together with a cloth or sheet 9 on both sides of the corrugated web using a thread 10, but note that the corrugated web could be sewn by the thread 10 alone. The cloth or sheet 9 may serve as the covering material 8 of the mattress, but note that the cushioning material 5 held by the cloth or sheet 9 could also be used as padding to be covered with another covering material 8. The particular method of sewing and the position of the stitches are variable. For instance, FIGS. 8(*a*) and (*b*) show a corrugated web sewn with the thread 10 passed vertically at positions between the side-by-side contact portions 7, and FIGS. 9(*a*) and (*b*) show the corrugated web sewn with the thread passed vertically at the side-by-side contact portions 7. In the respective drawings, figures (a) show examples of a chain stitch using one thread, and figures (b) show examples of a lock-stitch using needle thread and bobbin thread.

The corrugated web may also be held together by bonding or welding the corrugated web. With this method, an adhesive can be applied or sprayed to regions of the corrugated web to be bonded. Alternatively, a thermally weldable material may be applied to appropriate points on the corrugated web, and then later heated at a predetermined welding step. The methods of bonding and welding the corrugated web may also be used in combination.

The pile 2 of crimped fibers may be bonded as required, after needling, as for example disclosed in Japanese Patent No. 86-36954, by bonding the joints of respective fibers with an adhesive. Another method of bonding the fibers is to coat the fibers with a thermally meltable resin. The resin is then made molten to bond the joints of the fibers, thus enhancing the bonding strength. The methods of bonding the joints of the fibers, adhesive spraying or melting a thermally meltable resin, can be carried out after the formation of the corrugated web in order to bond both the joints of the fibers and the corrugated web at the same time.

FIG. 6(*a*) shows the relationship between load and the resulting strain for a specimen of the present invention. The specimen was obtained by needling a pile of polyester crimped fibers of 100 deniers in fineness and 50 mm in length at every 18 mm square area, approximately, to form a 20 mm thick flat board 4. Four such boards where laminated together, to form an 80 mm long by 80 mm wide by 80 mm high cube. Two such cubes were then loaded in two different, orthogonal directions, respectively, to obtain the strain measurements shown in FIG. 6(*a*). The 20 mm thick flat board thus obtained was subsequently used to form a cushioning material of a thickness $l_1$ of 90 mm and a thickness $l_2$ of 20 mm (see FIG. 5), the relationship between the load and the strain on this cushioning material was measured, and the result is shown in FIG. 6(*b*).

As has been discussed above, the present invention provides a cushioning material for a mattress which satisfies the requirements of having a moderate rigidity in order to prevent an unnatural sinking of a user into the mattress, softness at portions of the cushioning material of the surface near the cushioning material in contact with a user, moderate bendability and good permeability. These requirements are satisfied by needling a pile of crimped fibers to form a flat board, and continuously and alternately bending the flat board in a vertical direction to thus form consecutive side-by-side contact portions to form a final corrugated web.

Although the present invention has been described and illustrated with respect to preferred features thereof, it is to be understood that various modifications and changes may be made to the specifically described and illustrated features without departing from the scope of the present invention.

We claim:

1. A cushioning material for mattresses, comprising:

a corrugated web having opposite cushioning surfaces, said corrugated web comprising means for providing a relatively soft portion at said opposite cushioning surfaces and a moderately rigid portion between said opposite cushioning surfaces, said means for providing composed of an elongated flat board continuously and alternately bent to form a plurality of consecutive side-by-side contact portions and a plurality of bent portions interconnecting said plurality of side-by-side contact portions, wherein said corrugated web extends substantially in a plane and said plurality of consecutive side-by-side contact portions extend substantially perpendicular relative to said plane, and wherein said elongated flat board is composed of a pile of crimped fibers and said flat board has a plurality of needle punctures therein, extending in a thickness direction of said flat board substantially perpendicular to the direction of elongation of said elongated flat board, formed by needling said pile of crimped fibers, such that said bent portions are relatively soft in a direction generally perpendicular to said plane of said corrugated web and said side-by-side contact portions are moderately rigid relative to said bent portions in said direction generally perpendicular to said plane of said corrugated web; and holding means for holding said corrugated web together so as to maintain the shape of said corrugated web.

2. The cushioning material for mattresses as set forth in claim 1, wherein:

said holding means comprises at least one thread machine sewn on said corrugated web.

3. The cushioning material for mattresses as set forth in claim 1, wherein:

said holding means comprises an adhesive or weld.

4. A cushioning material for mattresses, comprising:

a corrugated web having opposite cushioning surfaces, said corrugated web comprising means for providing a relatively soft portion at said opposite cushioning surfaces and a moderately rigid portion between said opposite cushioning surfaces, said means for providing composed of an elongated flat board continuously and alternately bent to form a plurality of consecutive side-by-side contact portions and a plurality of bent portions interconnecting said plurality of side-by-side contact portions, wherein said corrugated web extends substantially in a plane and said plurality of consecutive side-by-side contact portions extend obliquely relative to said plane, and wherein said elongated flat board is composed of a pile of crimped fibers and said flat board has a plurality of needle punctures therein, extending in a thickness direction of said flat board substantially perpendicular to the direction of elongation of said elongated flat board, formed by needling said pile of crimped fibers, such that said bent portions are relatively soft in a direction generally perpendicular to said plane of said corrugated web and said side-by-side contact portions are moderately rigid relative to said bent portions in said direction generally perpendicular to said plane of said corrugated web; and holding means for holding said corrugated web together so as to maintain the shape of said corrugated web.

5. The cushioning material for mattresses as set forth in claim 4, wherein:

said holding means comprises at least one thread machine sewn on said corrugated web.

6. The cushioning material for mattresses as set forth in claim 4, wherein:

said holding means comprises an adhesive or weld.

* * * * *